United States Patent [19]

Kawahata et al.

[11] Patent Number: 5,395,690

[45] Date of Patent: Mar. 7, 1995

[54] METHOD FOR PRODUCING A DECORATIVE SHEET HAVING AN ADHESIVE LAYER ON ITS BACK SURFACE

[75] Inventors: Ichiro Kawahata, Itabashi; Takashi Matano, Miyoshi, both of Japan

[73] Assignee: Dai Nippon Kabushiki Kaisha, Japan

[21] Appl. No.: 108,010

[22] Filed: Aug. 18, 1993

Related U.S. Application Data

[63] Continuation of Ser. No. 800,723, Dec. 3, 1991, abandoned, which is a continuation of Ser. No. 269,060, Nov. 9, 1988, abandoned.

[30] Foreign Application Priority Data

Nov. 12, 1987 [JP] Japan ................................. 62-286320
Nov. 13, 1987 [JP] Japan ................................. 62-286614
Dec. 3, 1987 [JP] Japan ................................. 62-306718

[51] Int. Cl.$^6$ ........................... B32B 7/12; B05D 5/10
[52] U.S. Cl. ................................. 428/355; 428/354; 428/511; 428/479.6; 428/537.5; 427/207.1; 427/208.2
[58] Field of Search ............... 428/206, 207, 208, 511, 428/512, 513, 514, 343, 355, 354, 479.6, 537.5; 427/207.1, 208.2

[56] References Cited

U.S. PATENT DOCUMENTS

| | | | |
|---|---|---|---|
| 3,296,172 | 1/1967 | Funck et al. | 260/29.6 |
| 3,941,904 | 3/1976 | Hoh et al. | 428/346 X |
| 3,951,714 | 4/1976 | Franco | 428/206 X |
| 4,263,081 | 4/1981 | Scher et al. | 428/208 X |
| 4,374,692 | 2/1983 | Sümeghy | 428/511 X |
| 4,454,199 | 6/1984 | Berbeco | 428/511 X |
| 4,530,872 | 7/1985 | Pernicano | 428/206 X |
| 4,801,487 | 1/1989 | Klaus et al. | 428/206 |
| 4,863,782 | 9/1989 | Wong et al. | 428/206 X |
| 4,865,912 | 9/1989 | Mitsumata | 428/512 X |
| 4,892,605 | 1/1990 | Schneider et al. | 428/511 X |
| 4,916,007 | 4/1990 | Manning et al. | 428/207 X |
| 5,015,516 | 5/1991 | Lussi et al. | 428/207 X |

*Primary Examiner*—Daniel R. Zirker
*Attorney, Agent, or Firm*—Parkhurst, Wendel & Rossi

[57] ABSTRACT

A method for producing a decorative sheet having an adhesive layer on its back surface, which comprises coating the back surface of a decorative sheet comprising a printed pattern paper with a resin liquid which is liquid at room temperature according to a direct method, and then drying the coating of said resin to form an adhesive layer.

1 Claim, No Drawings

METHOD FOR PRODUCING A DECORATIVE SHEET HAVING AN ADHESIVE LAYER ON ITS BACK SURFACE

This is a continuation of application Ser. No. 07/800,723, filed Dec. 3, 1991, now abandoned, which is a continuation of application Ser. No. 07/269,060, filed Nov. 9, 1988, now abandoned.

BACKGROUND OF THE INVENTION

This invention relates to decorative sheets which are utilized in the step of finishing the surfaces of furniture and like articles and to a method for producing the same. More particularly, the present invention relates to a decorative sheet having an adhesive layer which can be adhered to a base material for a decorative plate only by hot pressing, that is, which can exhibit adhesiveness by hot pressing on the back surface, and to a method for obtaining the decorative sheet.

As a method for obtaining a decorative plate which exhibits excellent effect in design characteristics by causing a decorative sheet to adhere to a base material for a decorative plate, there are:

1) a method in which, during adhesion of a decorative sheet to a base material for a decorative plate, an adhesive is applied as a coating on the back surface of the decorative sheet or on the surface of the base material for the decorative plate, and subsequently heat and pressure are applied to obtain a decorative plate, and 2) a method in which a resin layer extruded into a film by an extruder is laminated on the back surface of a decorative sheet to obtain a decorative sheet having an adhesive layer on the back surface, and then this is adhered under heat and pressure onto a base plate for a decorative plate to obtain a decorative plate.

In the method for producing a decorative plate comprising a laminated product of a decorative sheet and a base material for a decorative plate of the prior art as described above, the method 1) requires a coating machine for an adhesive during production of the decorative plate, and therefore the production steps will become large in scale and time, because curing of the adhesive will be required during production of the decorative plate, whereby the production efficiency of the decorative plate will be poor. Furthermore, wrinkles, swelling, etc. caused by defective adhesion on the decorative plate obtained occur and give rise to defects such as poor appearance of the decorative plate.

On the other hand, the decorative plate obtained by the method 2) has an adhesive layer formed on the back surface of the decorative sheet which is obtained by causing a resin layer once formed into a film to adhere to the back surface of the decorative sheet and therefore has the drawback of weak adhesive force between the decorative sheet and the adhesive layer. Another drawback is that since the adhesive layer on the back surface of the decorative sheet is constituted of a resin having extrusion adaptability, that is, a resin having a high melting temperature, a high temperature is required during bonding of the decorative sheet onto the base material for a decorative plate by utilizing the hot-melting fusibility possessed by the adhesive layer through the resin, which is uneconomical and also entails a cumbersome temperature management. Also, since the adhesive layer on the back surface of the decorative sheet comprises a resin once rendered into a film laminated on the decorative sheet, the adhesive layer cannot be made thin, whereby a decorative sheet having an adhesive layer with desired physical properties cannot be obtained.

SUMMARY OF THE INVENTION

An object of the present invention is to provide a decorative sheet with which a decorative plate with good appearance can be easily produced without the accompaniment of the drawbacks in obtaining a decorative plate of the prior art described above, and a method for producing the decorative sheet.

The method for producing a decorative sheet having an adhesive layer on the back surface according to a first embodiment of the present invention comprises coating the back surface of a decorative sheet comprising a printed pattern paper with a resin liquid which is liquid at room temperature for formation of an adhesive layer according to the direct method, and subsequently heating and drying the coating to form an adhesive layer.

According to this invention there is provided a method for producing a decorative sheet having an adhesive layer on its back surface which, according to another embodiment of the invention, comprises coating the back surface of the decorative sheet comprising a printed pattern paper directly with a thermoplastic resin in a thermally molten state, and then cooling the resin to form an adhesive layer.

According to this invention in another aspect thereof, there is provided a decorative sheet having an adhesive layer on its back surface, comprising a decorative paper and an adhesive layer formed on the back surface of the decorative paper, wherein the adhesive layer contain a colorant.

The nature, utility, and further features of this invention will be more clearly apparent from the following detailed description beginning with general considerations and concluding with specific examples of practice.

DETAILED DESCRIPTION OF THE INVENTION

In the method for producing the decorative sheet having an adhesive layer on the back surface of the present invention comprising the above constitution, as the decorative sheet to which the adhesive layer is to be secured, use can be made of a decorative sheet comprising a printed pattern paper having printing with a printing ink using a vehicle of, for example, oils and fats, synthetic resins, cellulose derivatives, or rubber derivatives. The decorative sheet is formed according to a printing process such as gravure, offset, letterpress, ink jet, or silk screen, on a base paper for decorative sheet comprising, for example, print base paper for construction material of about 20 to 70 g/m$^2$, an interpaper reinforced paper which is an impregnated resin filled-in paper of about 20 to 70 g/m$^2$, a print paper for synthetic resin impregnated construction material of about 60 to 200 g/m$^2$, or a sheet having a surface protective layer with a resin layer formed on said printed pattern paper, namely, a decorative sheet of the prior art per se.

As the resin liquid for formation of the adhesive layer, a resin solution of a solvent soluble type resin as represented by, for example, vinyl type, acrylic type, polyamide type, epoxy type, rubber type, or urethane type, or a resin which is a liquid at room temperature comprising a monomer or a prepolymer of the type which is polymerized by heating or post-treatment such as UV-ray irradiation or electron beam irradiation can be used. Specific examples are adhesives such as unsaturated polyester, melamine, polyester (meth)acrylate, urethane (meth)acrylate, epoxy (meth)acrylate, polyether (meth)acrylate, polyol (meth)acrylate, melamine (meth)acrylate and silicone (meth)acrylate, or hot melt adhesives, can be used.

Among those mentioned above, a solvent soluble type resin is preferred because the resin itself has high tackiness, above all particularly a polyamide resin.

The addition of a tackifier to a hot melt adhesive of the prior art type such as ethylne/vinyl acetate type copolymer is indispensable in order to augment the tackiness, but the tackifier added tends to separate with elapse of time, and therefore it is not suitable for use when the product is to be placed for a long time on a shelf in the form of furniture, etc. after adhesion as in the case of a decorative sheet. However, in the case of a solvent soluble resin, it can be used because no such drawback will occur.

The above resin liquid is applied as a coating on the back surface of the decorative sheet at room temperature according to a direct method, for example, a coating method such as gravure roll coating, doctor blade coating, or reverse coating to about 10 to 50 g (solid component)/m$^2$, preferably about 20 to 30 g (solid component)/m$^2$, followed by heating and drying, to be formed into an adhesive layer.

The present invention as described above also has a specific feature in the application of the coating of a resin liquid according to a direct method. The "direct method" in the present invention means application of a resin liquid as a coating from the coater to the back surface of the decorative sheet directly, that is, substantially without time interval or spatial gap.

The decorative sheet comprising the above printed pattern paper on which an adhesive layer is to be formed on the back surface may also have a surface protective layer of a resin film as described above. This surface protective layer is easily formed by applying a coating on the surface of the printed pattern paper of a resin such as, for example, an urethane resin such as acryl-modified urethane or polyester-modified urethane, an amino alkyd resin, a polyester resin, an acryl-modified resin, a phenol resin, a melamine resin, a melamine alkyd resin, an epoxy resin, or a diallylphthalate resin, according to a coating method such as natural roll coating, gravure coating, air knife coating, reverse roll coating, bar coating, flow coating, or spray coating to 2 to 30 g (solid component)/m$^2$, preferably 2 to 10 g (solid component)/m$^2$, or covering the surface with an already formed film.

The resin liquid to be coated on the back surface of the decorative sheet comprising the above printed pattern paper also may be a resin liquid containing an inorganic filler, and a resin liquid containing about 1 to 100 parts by weight of an inorganic filler such as calcium carbonate, barium sulfate, titanium dioxide, clay, talc, magnesium oxide, or magnesium carbonate per 100 parts by weight of the resin component may be utilized.

The inorganic filler to be added in the above resin liquid is used for the purpose of:

1) improving the handling characteristics of the resin liquid used for coating;

2) adjusting the resin liquid to a suitable viscosity;

3) causing the adhesive layer formed to have characteristics such as slipping characteristic and antiblocking characteristic;

4) reducing shrinkage of the adhesive layer formed, thereby preventing generation of cracks in the adhesive layer;

5) preventing defective adhesion between the decorative sheet and the adhesive layer;

6) preventing excessive penetration of the coated resin liquid into the decorative sheet; and 7) improving the heat resistance of the adhesive layer formed, etc.

Particularly when a solvent soluble type resin is used, it has advantages such as high tackiness, little change in tackiness with lapse of time, while on the other hand it has a narrower melting point range as compared with ethylene/vinyl acetate type copolymers, etc., whereby control of the heat applied during adhesion of the decorative sheet onto the base plate is difficult. By the addition of an inorganic filler as described above, the tolerable range of the heat applied during adhesion of the decorative sheet can be broadened.

An example of a preferable resin composition for the adhesive layer in the present invention is as follows, all parts being by weight.

Dimer acid base polyamide resin 40 parts
N-ethylorthoparatoluenesulfonamide 3 parts
Microsilica 1 part
Calcium carbonate 20 parts
Toluene/xylene/isopropanol (1/1/1) 60 parts The method for producing the decorative sheet having an adhesive layer on its back surface according to a second embodiment of the present invention comprises forming a coated layer by direct coating of a thermoplastic resin in a thermally molten state by, for example, a slot orifice coater or a roll coater, and then solidifying by cooling the above coated layer to form an adhesive layer.

Examples of the thermoplastic resin for formation of the adhesive layer to be used in thermally molten state are thermoplastic resins as represented by ethylene-vinyl acetate copolymer, polyethylene, low molecular weight polyethylene, atactic polypropylene, polyamide, polyester, styrene-butadiene block copolymer, styrene-isopropylene block copolymer, polyvinyl acetate, ethylene-ethyl acrylate, EVA-azide terpolymer, polycarbonate, polyvinyl ether, polyurethane, polyacetal, polyisobutylene, and butyl rubber. It is possible to add an inorganic filler similarly as in the resin liquid.

In the method for producing the decorative sheet having an adhesive layer of its back surface of the present invention, the thermoplastic resin in a thermally molten state is coated by direct coating by means of an applicator such as a slot orifice, or a roll coater. That is, the thermoplastic resin is directly coated onto the back surface of the decorative sheet in a molten state without film formation while maintaining the thermally molten state, and an adhesive layer is formed by coating generally to about 10 to 50 g (dry)/m$^2$, preferably 20 to 30 g (dry)/m$^2$, followed by cooling and solidification.

The decorative sheet having an adhesive layer on its back surface of the present invention comprises a decorative sheet and an adhesive layer formed on the back surface of the decorative sheet, and moreover the adhesive layer may contain a colorant.

For the base paper for a decorative sheet, a colored base paper also can be used, and if the shielding characteristic of the decorative sheet on which the adhesive layer is provided is inadequate or if the decorative sheet has a portion with inadequate shielding characteristics since, in the decorative sheet of the present invention, coloration caused by the colorant in the adhesive layer is visually recognized through the above portion with inadequate shielding characteristics, the decorative sheet exhibits excellent effects of design characteristic of a rich solid feeling.

The adhesive layer on the back surface of the above decorative sheet is a resin layer containing a colorant such as an organic pigment, an inorganic pigment or a dye.

The colorant in the adhesive is a dye, an organic pigment, an inorganic pigment, metal powder or the like. Among these from the standpoint of shielding performance fulfilled by the adhesive layer or inhibition of generation of migration of the colorant during formation of the adhesive layer, an inorganic pigment is most suitable.

These colorants are dispersed or dissolved in the resin for formation of the adhesive layer in the conventional manner and coated on the back surface of the decorative sheet. When the resin for formation of the adhesive layer is used as a solution in a solvent, the colorant can be dispersed or dissolved merely by adding a colorant in the resin solution and stirring or kneading the mixture, whereby coloration can be effected simply.

The mixing ratio of the resin and the colorant in the adhesive layer is 10 to 200 parts by weight of the colorant per 100 parts by weight of the resin when the colorant is a pigment. If the colorant is less than 10 parts by weight, the coloration effect is insufficient, while if it exceeds 200 parts by weight, not only the adhesive performance of the adhesive layer is lowered, but also working efficiency accompanied with elevation of dissolving viscosity will be lowered. A more preferable amount to be added is 10 to 100 parts by weight.

As the colorant in the adhesive layer, it is most preferable to utilize the colorant with a tone such that the above mentioned adhesive layer will exhibit a tone which is the same as or similar to the whole tone in the decorative paper.

The decorative sheet of the present invention can be formed by coating the back surface of a decorative sheet comprising a printed pattern paper with a resin liquid containing a colorant by the direct method.

When the resin liquid for formation of the adhesive layer is a thermoplastic resin liquid in a thermally molten state, the decorative sheet back surface is coated with the above resin liquid by a slot orifice coater or a roll coater, that is, the decorative sheet back surface is coated with the above thermoplastic resin from molten state without film formation, while maintaining the thermally molten state, and generally an adhesive layer is formed by coating to 10 to 50 g (dry)/m², preferably about 20 to 30 g (dry)/m², followed by cooling and solidification. On the other hand, when the resin liquid for formation of adhesive layer is a solvent soluble resin, an adhesive layer is formed by coating the solution by such coating methods as gravure roll coating, doctor blade coating, reverse coating, etc. generally to 10 to 50 g (dry)/m², preferably about 20 to 30 g (dry)/m², followed by heating and drying. From the standpoint of easy dispersibility of the colorant when a pigment is used as the colorant, its amount which can be mixed, a coating precision, etc., the coating method according to gravure roll coating is the most suitable.

When the colorant contained in the adhesive layer is an inorganic pigment, there is the same effect as when an inorganic filler is added.

EXAMPLE 1

On a tissue paper of 30 g/m² prepared by a paper making process with pulp fibers having a cationic acrylic resin adsorbed thereon, printing of a wood grain pattern was performed by a conventional gravure printing method. On the above printed surface was applied a curable urethane resin [UM-50: Morohoshi Ink K.K.] by means of a gravure printer in a quantity of 5 g (solid component)/m², which step was followed by curing thereof to obtain a decorative sheet comprising a printed pattern paper having a surface protective layer.

Then, a solvent type urethane resin [BSS-1400: Morohoshi Ink K.K.] was applied on the back surface of the above decorative sheet at room temperature according to the reverse coating method in a quantity of 30 g (solid component)/m² and subsequently heated, dried and cooled to obtain a decorative sheet having an adhesive layer on its back surface which was the desired product.

Further, the decorative sheet thus obtained was caused by application of heat and pressure to adhere, by utilizing the adhesive layer at the back surface thereof, to a particle board under the conditions of a line pressure of 50 kg/cm, a hot roll temperature of 150° C. and a roll speed of 15 m/min to obtain a decorative board comprising the above decorative sheet.

The decorative sheet obtained as described above had a great adhesive strength between the printed pattern paper and the adhesive layer, and no peeling occurred between the printed pattern paper and the adhesive layer when the sheet was subjected to a cross cut test and a peeling test.

The above mentioned decorative plate obtained by hot pressure bonding the decorative sheet to a particle board had a strong adhesive strength between the decorative sheet and the particle board, and there was no creasing or swelling whatsoever on the decorative sheet surface forming the surface layer of the decorative plate, thus giving a decorative plate of good quality.

EXAMPLE 2

After a decorative sheet was obtained similarly as in Example 1, a composition comprising mainly a solvent soluble type polyamide resin having the following formulation was applied on the back surface of the decorative sheet in a quantity of 30 g/m² (solid component), and subsequently dried by heating at a temperature of 150° C. for 30 seconds, followed by cooling to obtain a decorative sheet having an adhesive layer on its back surface.

Dimer acid based polyamide resin 40 parts by wt.
N-ethylorthoparatoluenesulfonamide 3 parts by wt.
Microsilica 1 part by wt.
Calcium carbonate 20 parts by wt.
Toluene/xylene/isopropanol (1/1/1) 60 parts by wt.

The decorative sheet obtained was bonded onto a particle board similarly as in Example 1, whereby the tolerable range of the hot roll temperature during lamination was broadened as compared with the case of Example 1.

EXAMPLE 3

After a decorative sheet was obtained similarly as in Example 1, an ethylene-vinyl acetate resin [NUC copolymer J6169: Nippon Unicar K.K.] thermally molten at 200° C. was applied by means of a slot orifice coater on the back surface of the above decorative sheet, followed by cooling to form an adhesive layer with a thickness of 10 um, thereby obtaining a decorative sheet having an adhesive layer of its back surface, which was the desired product.

When the decorative sheet was bonded onto a particle board similarly as in Example 1, the same performance as in Example 1 could be obtained.

EXAMPLE 4

Example 3 was repeated except for the use of 15 parts by weight of Iron Oxide Yellow and 5 parts by weight of Carbon Black added to 80 parts by weight of the same ethylene-vinyl acetate resin as used in Example 3 to obtain a decorative sheet.

When the decorative sheet obtained was bonded onto a ply plate, there was no influence from the color of the ply plate on the decorative sheet.

Also, when a flaw was attached on the decorative sheet on the ply plate and a part of the decorative sheet was peeled off, the flaw was found to be not very conspicuous.

EXAMPLE 5

On a print base paper for construction material comprising a colored tissue paper with a basis weight of 23 g/m$^2$, a wood grain pattern printing was effected by a conventional gravure printing method, and subsequently on the above printed surface was applied a curable urethane resin [UM-50: Morohoshi Ink K.K.] by means of a gravure printer at a ratio of 5 g (solid component)/m$^2$, followed by curing thereof, to obtain a decorative sheet comprising a printed pattern having a surface protective layer.

Then, on the back surface of the above decorative sheet was coated a resin liquid for formation of an adhesive layer having a composition shown below according to the gravure coating method to a ratio of 30 g-(dry)/m$^2$, followed by drying and cooling to obtain a decorative sheet having an adhesive layer containing a colorant on the back surface which is the desired product.

Resin liquid for formation of the adhesive layer

| | |
|---|---|
| Polyamide resin (BSA40: Morohoshi Ink K.K.] | 100 parts by wt. |
| Iron oxide | 10 parts by wt. |
| Benzidine Yellow | 20 parts by wt. |
| Solvent [toluene/isopropanol = 1/1] | 30 parts by wt. |

The above decorative sheet obtained had a large adhesive force between the printed pattern paper and the adhesive layer, and no peel-off between the printed pattern paper and the adhesive layer occurred even by both the cross cut test and the peeling test.

The above decorative plate obtained by hot pressure adhesion of the above decorative sheet to the particle board similarly as in Example 1 had a strong adhesive force between the decorative sheet and the particle board, and yet there was no generation of creases or swelling on the decorative sheet surface forming the surface layer of the decorative plate, and further the adhesive layer between the decorative sheet and the particle board was colored in yellow. Accordingly, when the decorative plate was cut in small sections, existence of the adhesive layer was not conspicuous at all, and yet coloration in the adhesive layer could be visually recognized through the decorative sheet from the surface of the decorative plate, thus exhibiting excellent action with deep design characteristics.

The decorative sheet obtained according to the method of the above embodiments 1 and 2 of the present invention comprising the constitutions as described above has the adhesive layer on the back surface which is formed by coating a resin liquid which is liquid at normal temperature according to the direct method, followed by heating and drying. Therefore, the adhesive layer is not required to be constituted of a resin having extrusion adaptability and a resin with relatively lower melting temperature can be selected and used to form the adhesive layer. Accordingly, this method is also excellent in that a decorative plate of good quality can be obtained under the hot pressure adhesion condition which is by far lower in temperature as compared with the decorative sheet of the prior art having an adhesive layer with a resin having extrusion adaptability in obtaining a decorative plate by adhering a decorative sheet to a base material for a decorative plate.

Also, the decorative sheet obtained according to the production method of the present invention has an adhesive layer which is formed by coating a resin liquid which is liquid at normal temperature according to the direct method, followed by heating and drying as described above. Therefore, as compared with the sheet of the prior art provided with an adhesive layer formed with a resin having extrusion adaptability which is formed by utilizing melt extrusion molding, the adhesive can be thoroughly penetrated into the back surface of the decorative sheet, whereby the adhesive force between the decorative sheet and the adhesive layer is large, and a part of the adhesive layer will not be separated from the back surface of the decorative sheet before application of the decorative sheet to a base material for the decorative plate. Therefore, a decorative plate of high quality free from generation of swelling or wrinkles, which may be caused by non-adhesion between the adhesive layer and the back surface of the decorative sheet, can be obtained.

Further, since the adhesive layer in the decorative sheet obtained by the production method of the present invention is formed by coating a resin liquid which is liquid at normal temperature, followed by heating and drying, as described above, a thinner adhesive layer can be formed as compared with the adhesive layer formed by utilizing melt extrusion molding. Therefore, according to the present invention, a decorative sheet having an adhesive layer with desired physical properties can be obtained.

Also, since the decorative sheet obtained by the method of the present invention can be adhered to the base material for the decorative plate only with hot pressure, during production of the decorative plate, it is not required to use an adhesive coating machine as in the case of the decorative sheet of the prior art which is adhered by application of an adhesive to a base material for the decorative plate. Accordingly, the production steps of the decorative plate are simple according to the present invention, and also it is not necessary to provide a curing time for an adhesive as in the prior art method. Therefore, the method of the present invention also has such excellent effects that the production efficiency of the decorative plate is good, and yet a decorative plate of good quality without generation of wrinkles or swelling due to defective adhesion can be obtained.

Further, the decorative sheet of the present invention also brings about the action and the effect of good appearance because the decorative plate obtained by adhesion of the decorative sheet to a base material for the decorative plate exhibits a colored film shape of the adhesive layer in the decorative plate. Therefore, when the decorative plate is cut in small sections or a flaw is formed on the decorative plate, etc. the existence of the adhesive layer will not be conspicuous.

What is claimed is:

1. A decorative sheet to be applied to a substrate, comprising:
   a resin-impregnated paper having first and second opposed major surfaces, and a printed pattern formed on said first major surface thereof; and
   an adhesive layer formed on said second major surface of said paper, said adhesive layer comprising an inorganic filler and a dimer acid based polyamide resin, said adhesive layer being maintained in a non-adhesive state until said sheet is to be applied to a substrate;
   wherein said decorative sheet is formed by:
   (i) coating said second major surface of said paper with a thermoplastic resin liquid comprising said inorganic filler, said dimer acid based polyamide resin, and a solvent mixture selected from (a) toluene and isopropanol, and (b) toluene, xylene and isopropanol, said resin liquid being in a liquid state at room temperature; and
   (ii) drying and cooling the coated resin liquid to thereby form said adhesive layer in a solidified, non-adhesive state on said second major surface of said paper.

* * * * *

UNITED STATES PATENT AND TRADEMARK OFFICE
CERTIFICATE OF CORRECTION

PATENT NO. : 5,395,690

DATED : March 7, 1995

INVENTOR(S) : Ichiro KAWAHATA and Takashi MATANO

It is certified that error appears in the above-indentified patent and that said Letters Patent is hereby corrected as shown below: On the title page:

Item [73], after "Nippon" insert --Insatsu--.

Signed and Sealed this

Twenty-fifth Day of April, 1995

Attest:

BRUCE LEHMAN

*Attesting Officer*     *Commissioner of Patents and Trademarks*